US 6,658,657 B1

(12) United States Patent
Lueh

(10) Patent No.: US 6,658,657 B1
(45) Date of Patent: Dec. 2, 2003

(54) METHOD AND APPARATUS FOR REDUCING THE OVERHEAD OF VIRTUAL METHOD INVOCATIONS

(75) Inventor: Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,373

(22) Filed: Mar. 31, 2000

(51) Int. Cl.[7] .............................. G06F 9/45; G06F 9/44
(52) U.S. Cl. .................... 717/158; 717/116; 717/140; 717/148; 717/165
(58) Field of Search ................... 717/151, 152–161, 717/146–150, 124–133, 136–137, 140–141, 166, 162, 165, 168–178, 116, 100; 709/104, 316, 322; 712/233–240; 714/35

(56) References Cited

U.S. PATENT DOCUMENTS

| | | | | |
|---|---|---|---|---|
| 5,615,400 A | * | 3/1997 | Cowsar et al. ............... | 709/332 |
| 5,692,195 A | * | 11/1997 | Conner et al. ............... | 709/316 |
| 5,740,443 A | * | 4/1998 | Carini ......................... | 717/133 |
| 5,857,105 A | * | 1/1999 | Ayers et al. ................. | 717/144 |
| 5,920,723 A | * | 7/1999 | Peyton, Jr. et al. .......... | 717/157 |
| 6,345,382 B1 | * | 2/2002 | Hughes ....................... | 717/100 |

OTHER PUBLICATIONS

Calder et al., Reducing Indirect Function Call Overhead In C++ Programs, Jun. 1994, ACM Principles and Practice of Programming Languages, Portland, Oregon.*
Burke et al., The Jalapeno Dynamic Optimizing Compiler for Java, Mar. 1999, ACM.*
Suganuma, Overview of the IBM java Just–in–Time Compiler, Jan. 2000, IBM Systems Journal, vol. 39, No. 1.*
Calder et al., Reducing Indirect Function Call Overhead In C++ Programs, Jun. 1994, ACM Principles and Practice of Programming Languages, Portland, Oregon.*
Burke et al., The Jalapeno Dynamic Optimizing Compiler for Java, Mar. 1999, ACM.*
Suganuma, Overview of the IBM java Just–in–Time Compiler, Jan. 2000, IBM Systems Journal, vol. 39, No. 1.*
Aigner–Holzle, Eliminating Virtual Function Calls in C++ Programs, Dec. 1995, Department of Computer Science, University of California, Santa Barbara, CA, Technical Report TRCS 95–22.*

* cited by examiner

*Primary Examiner*—Hoang-Vu Antony Nguyen-Ba
(74) *Attorney, Agent, or Firm*—Blakely, Sokoloff, Taylor & Zafman LLP

(57) ABSTRACT

A method including compiling a method bar having a virtual method call. The virtual method call is eliminated. The method bar is inlined without generating checking code, and dynamically loading a class.

24 Claims, 13 Drawing Sheets

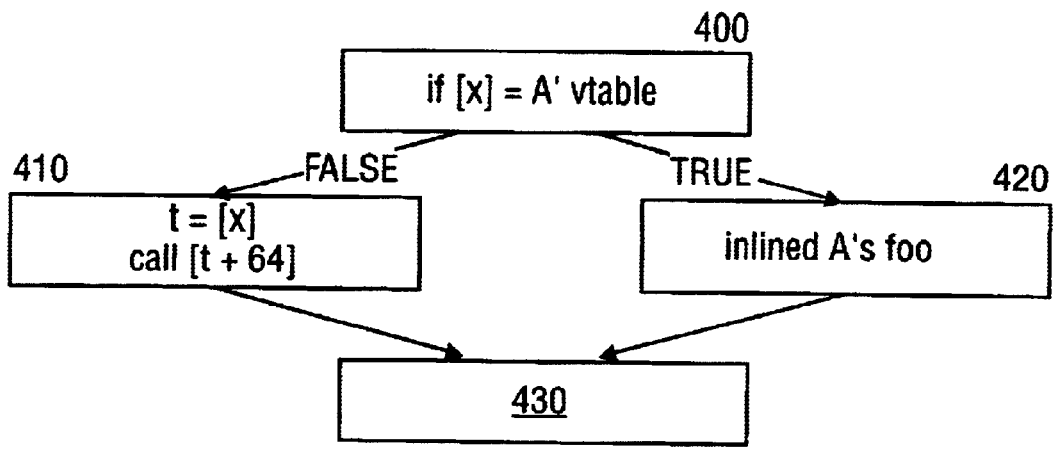
FIG. 4
(PRIOR ART)
```
mov eax, DWORD PTR [eax]  // get vtable
cmp eax, 0bc3508h
jnz _default_invocation
// inlined callee
  . . .
_default_invocation:
    // normal invocation code
    . . .
```
FIG. 5
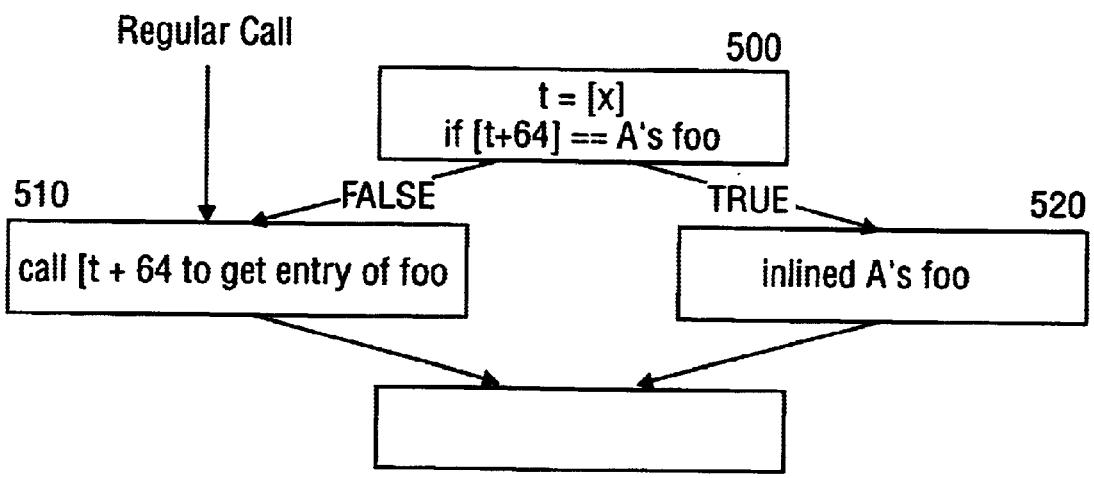
FIG. 6
(PRIOR ART)

```
// get vtable
mov eax, DWORD PTR [eax]
// get target address
mov ecx, DWORD PTR [eax+64]
cmp ecx, [BE762Ch]
jnz _default_invocation
// inlined callee
 . . .
_default_invocation:
    // normal invocation code
 . . .
```

FIG. 7
(PRIOR ART)

Byte code method_get_code_block_addr (caller)
Byte first_byte_addr code + parch>code_offset:

// step 1: write a spinning inst
__asm (
    mov eax, first_bye_addr
    mov cx, 0xFEEB      // spinning
    lock xchg word ptr [eax], ex
)

// step 2: restore cmp inst except the first two bytes
for (int j + 2, j < patch->length, j++)
    code[patch->offset + j] + patch->orig_code[j];

// step 3: restore the first two bytes
Byte first_orig_addr = (Byte) patch->orig_code,
__asm (
    mov eax, first_byte_addr
    mov edx, first_orig_addr
    mov cx, word ptr [edx]
    lock xchg word ptr [eax], cx

FIG. 16

METHOD AND APPARATUS FOR REDUCING THE OVERHEAD OF VIRTUAL METHOD INVOCATIONS

BACKGROUND OF THE INVENTION

1. Field of the Invention

The invention relates generally to reducing the burden placed on computer systems and more specifically to reducing the overhead of virtual method invocations.

2. Description of Related Art

Since the advent of computers, computer scientists and engineers have strived to make computers faster. Programming languages such as object-oriented programming languages (e.g., Java, C++, etc.) create additional burden on a computer system through invocation of virtual method calls which affects the time involved in executing program instructions. Virtual method calls cannot be easily eliminated because the compiler is unaware of which callee of the virtual method callee ("callee") will be invoked. Invoking a callee depends upon the class hierarchy being used. Class hierarchy is a way of organizing information in which related classes are connected in a tree-like structure. FIGS. 1 and 2 illustrate two simple class hierarchies that show how a callee is invoked. FIG. 1 illustrates a simple class hierarchy in which "A" is a superclass of "B". The arrow from class B to A means that A is a superclass of B as in FIG. 1. Invoking a call to foo for "B" objects should invoke "A's" foo method. Foo is a function call. A function call may include parameters such as a subroutine or may be without parameters such as a function. Using the principle presented in FIG. 1, FIG. 2 illustrates another class hierarchy that is slightly more complex in which A is a superclass of B and B is a superclass of C. C_object is converted to type "B" and is passed to method bar ( ). Method bar ( ) is a name of a function. In method bar ( ), b_object.foo ( ) invokes "C's" foo method instead of "A's" foo method. If "A's" foo method is the correct callee but "C's" foo was invoked instead, the method is inaccurate because the wrong foo was called.

Inlining is a technique used in compilers to reduce the overhead of method invocations by replacing a call site (i.e., a call instruction) with the method body of the callee. When inlining a virtual method, multiple instances of the method may be invoked. Compilers, therefore, must ensure that the right instance of the method is executed. There are generally two conventional inlining approaches that may be used to reduce virtual method calls: (1) checking virtual tables as illustrated in FIG. 4, and (2) checking foo addresses as illustrated in FIG. 6.

In order to understand these two conventional approaches, object layouts, which directly influences inlining, are explained. FIG. 3 depicts the object layout used in most implementations of object-oriented languages (e.g., C++, Java, etc.). Reference x points to an object 200. As shown in FIG. 3, object 200 contains data 205 of the object 200 such as different types of fields, integer floating points, other types of pointers, or other data. The first field to which the object points is the virtual method table ("vtable") 210. Vtable 210 contains all of the function pointer entries. More specifically, for each virtual method of the object, there is a dedicated entry in the vtable pointing to the native code of the method. To access the address of a virtual method foo, the pointer must be dereferenced. Dereferencing involves retrieving information from an address by a pointer. The pointer indicates the location of the data. It will be appreciated that every time a dereference occurs, a memory access occurs. The first dereference accesses vtable 210 (t=[x]). "T" refers to the beginning point of vtable 210. The second dereference accesses the address of foo ([t+64]) 230. "T +64" is the amount of off-set from "t." This entry of the reference accesses the actual native code object address which is foo. Vtable also contains entries pointing to other methods such as bar 220.

As the virtual method gets inlined, the compiler such as a just-in-time (JIT) compiler generates a run-time test to verify if the inlined callee is the right instance to be invoked. The typical method invocation code sequence is executed if the verification fails. The run-time test is typically implemented by checking the vtable 210 or by checking foo of the actual target address of the method invocation. Checking the vtable 210 involves comparing the object's vtable 210 with the vtable of the class of the inlined method. If the comparison is successful (i.e., object 200 matches the vtable of the class of the inlined method), it is safe to execute the inlined code because the inlined method will be dynamically dispatched at runtime. If the comparison fails (i.e., object 200 does not match the vtable of the class of the inlined method), the conventional dispatching code sequence is executed to invoke the virtual method call. FIG. 5 shows the iA32 native code sequence. For clarity, the control flow graph of the inlined code is depicted in FIG. 4. The conventional dispatching code is shown at 410 of FIG. 4. The benefit of this conventional approach is that only one memory access ([x]) 400 is involved to determine if either "A's" foo is inlined at operation 420 or the conventional call sequence 410 should be executed as illustrated in FIG. 4. For instance, if [x] ="A's" vtable, "A's" foo is inlined at operation 420. Additionally, only one comparison must be performed of the vtable address, and one comparison of the branch to the vtable (e.g., branch to the inline version). But one drawback to this conventional approach is that checking the vtable is conservative and less accurate. For example, referring to FIG. 2, if "x" is always a type B class, the checking always fails because "A" and "B" objects have distinct vtables. More specifically, "A" is a superclass of "B" and "C". "C's" object is "B"'s object and "A's" object, but not vice versa. After this process, FIG. 4 shows a merge point occurs at 430. A merge point is where the computer program returns to another operation that may be unrelated to an inlining operation.

The second conventional approach illustrated in FIG. 6 relates to inserting code to compare the actual method address that x.foo ( ) is invoking with the address of "A's" foo. Although the second conventional approach is more precise at inlining "A's" foo 520 than the first conventional approach, checking the target address requires at least two memory accesses (i.e., [x] and [t+64]) such as operations 500, 510. In JIT compiler, a method is compiled before its first execution. If A's foo is not yet compiled, the actual address of A's foo is unknown. The JIT compiler then allocates memory space in which to fill the address of A's foo as soon as A's foo is compiled. In such a circumstance, the test requires 3 memory accesses. FIG. 7 shows the iA32 native code sequence that implements this approach. OXBE762Ch is the address of the place holding the address of the inlined method. It is therefore desirable to have a method that reduces the number of memory accesses and improves accuracy of inlining a method bar.

BRIEF DESCRIPTION OF THE DRAWINGS

The features, aspects, and advantages of the invention will become more thoroughly apparent from the following detailed description, appended claims, and accompanying drawings in which:

FIG. 4 illustrates a flow diagram of the prior art.

FIG. 5 illustrates a code used to check a virtual table of the prior art.

FIG. 6 illustrates a foo's address of the prior art.

FIG. 7 illustrates code used for checking a target address of the prior art.

FIG. 16 illustrates code patching in accordance with one embodiment of the invention.

DETAILED DESCRIPTION OF THE INVENTION

The following detailed description and the accompanying drawings are provided for the purpose of describing and illustrating presently preferred embodiments of the invention only, and are not intended to limit the scope of the invention in any way.

One embodiment of the invention involves reducing overhead related to an object-oriented programming language (e.g., Java, C++, etc.) by using a method in which a method having a virtual method is compiled. The virtual method is eliminated. The method is then inlined without generating checking code.

The claimed invention eliminates the overhead of checking code. In comparison, conventional techniques require that the code be checked. In another aspect, the invention is more precise than the conventional techniques. Still further, inlining decisions can be adjusted dynamically based upon the program instruction's runtime behavior.

Figure 1:
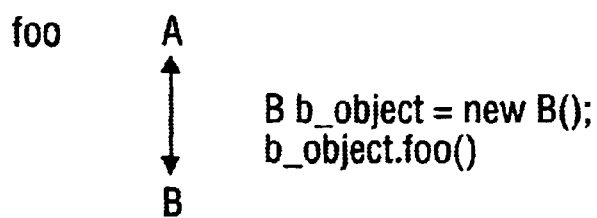
FIG. 1 illustrates a class hierarchy of the prior art.
Figure 2:
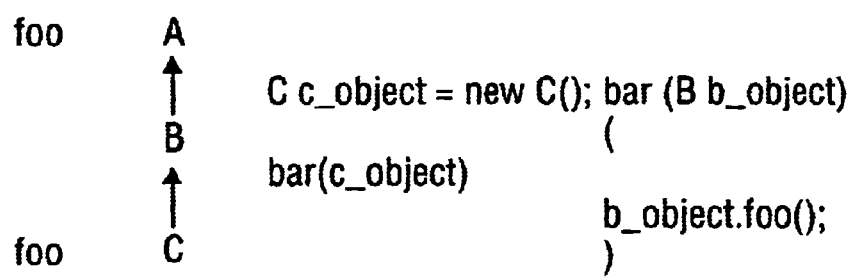
FIG. 2 illustrates a class hierarchy of the prior art.
Figure 3:
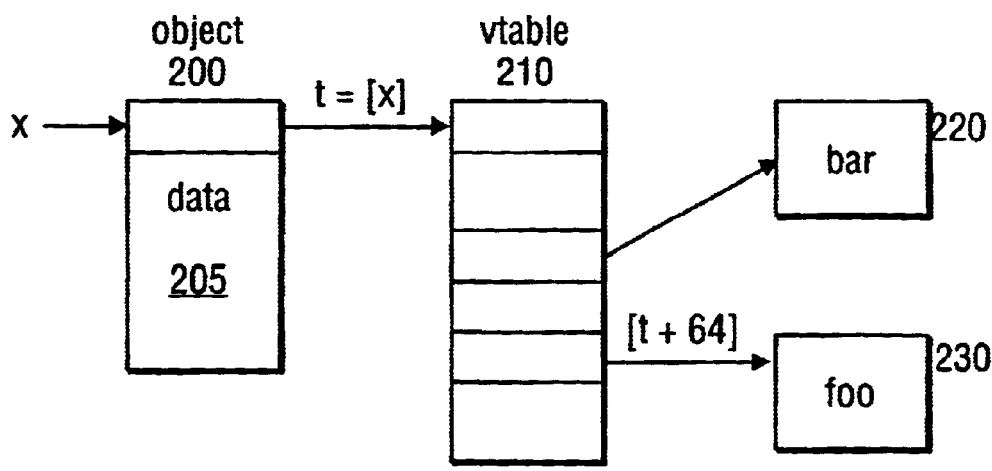
FIG. 3 illustrates an object layout of the prior art.
Figure 8:
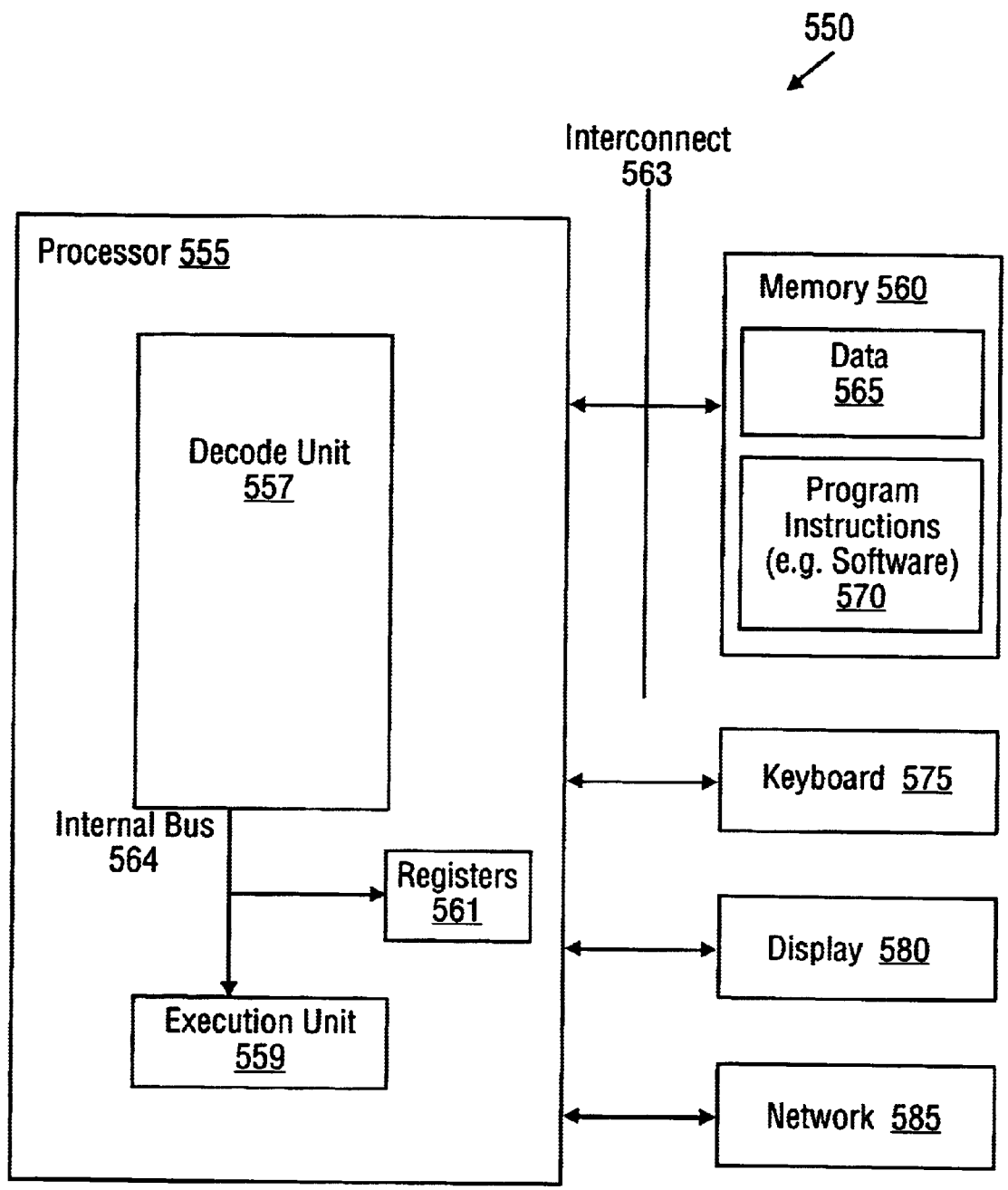
FIG. 8 illustrates a computer system in accordance with one embodiment of the invention.

FIG. 8 illustrates one embodiment of a computer system 550 which implements the principles of the present invention. Computer system 550 comprises a processor 555, a memory 560, and a interconnect 563. Processor 555 is coupled to the memory 560 by interconnect 563. In addition, a number of user input/output devices, such as a keyboard 575 and a display 580, are also coupled to the interconnect 563. Processor 555 represents a central processing unit of any type of architecture (e.g., the Intel architecture, Hewlett Packard architecture, Sun Microsystems architecture, IBM architecture, etc.), or hybrid architecture. In addition, processor 555 could be implemented on one or more chips.

Memory 560 represents one or more mechanisms for storing data such as the number of times an instance is invoked, the compilation of a method having a virtual method call, the elimination of a virtual method call, and inlining the method without generating checking code. Memory 560 may include read only memory ("ROM"), random access memory ("RAM"), magnetic disk storage mediums, optical storage mediums, flash memory devices, and/or other machine-readable mediums. Interconnect 563 represents one or more buses (e.g., accelerated graphics port bus, peripheral component interconnect bus, industry standard architecture bus, X-Bus, video electronics standards association related to buses, etc.) and bridges (also termed as bus controllers). While this embodiment is described in relation to a single processor computer system, the invention could be implemented in a multi-processor computer system. In addition to other devices, one or more of a network 585 may be present. Network 585 represents one or more network connections for transmitting data over a machine readable media. The invention could also be implemented on multiple computers connected via such a network.

FIG. 8 also illustrates that the memory 560 has stored therein data 565 and program instructions (e.g., computer program, software, etc.) 570. Data 565 represents data stored in one or more of the formats described herein. Program instructions 570 represents the necessary code for performing any and/or all of the techniques described with reference to FIGS. 9–17B. It will be recognized by one of ordinary skill in the art that the memory 560 preferably contains additional software (not shown), which is not necessary to understanding the invention.

FIG. 8 additionally illustrates that the processor 555 includes decode unit 557, a set of registers 561, and execution unit 559, and an internal bus 564 for executing instructions. It will be recognized by one of ordinary skill in the art that the processor 555 contains additional circuitry, which is not necessary to understanding the invention. The decode unit 557, registers 561 and execution unit 559 are coupled together by internal bus 564. The decode unit 557 is used for decoding instructions received by processor 555 into control signals and/or microcode entry points. In response to these control signals and/or microcode entry points, the execution unit 559 performs the appropriate operations. The decode unit 557 may be implemented using any number of different mechanisms.

Figure 9:
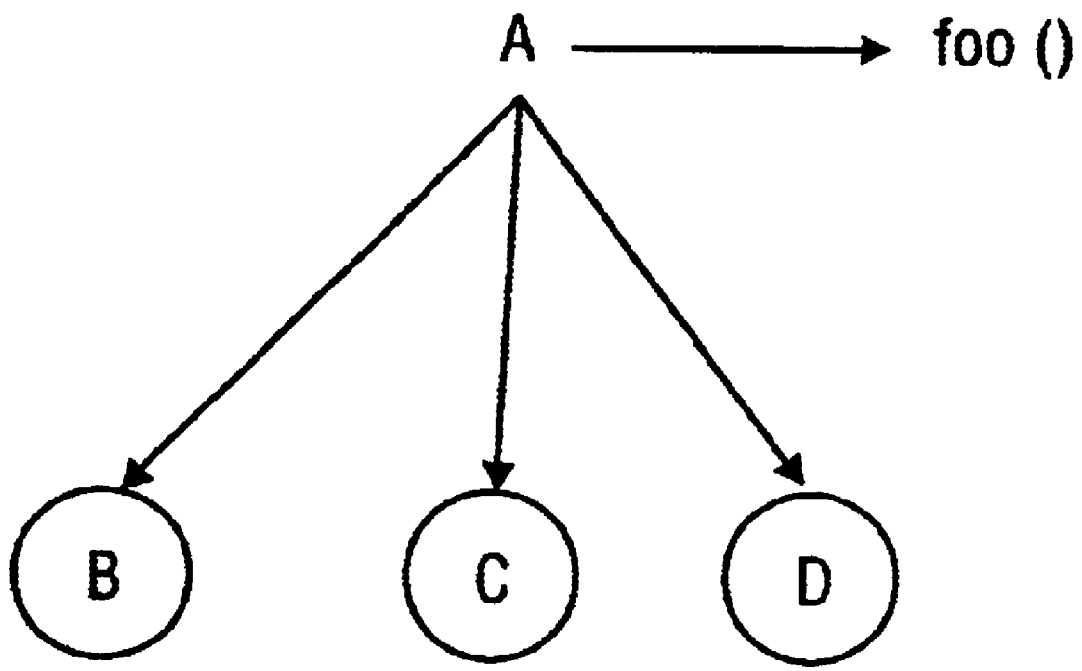
FIG. 9 illustrates a class hierarchy in accordance with one embodiment of the invention.
Figure 10:
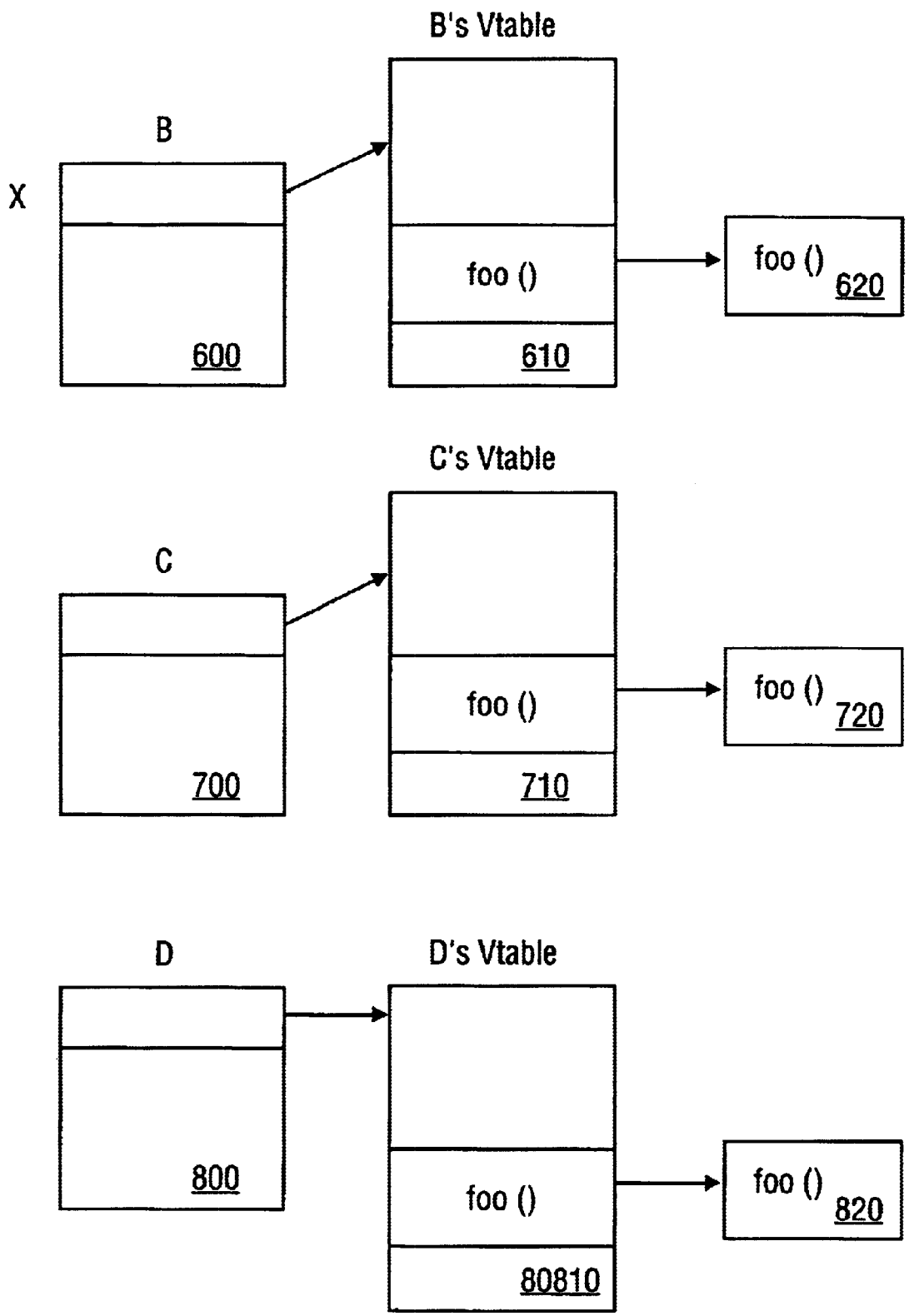
FIG. 10 illustrates a class hierarchy in accordance with one embodiment of the invention.

FIGS. 9 and 10 illustrate a class hierarchy and the class hierarchy in relationship to each class object and vtable that may be used in accordance with one embodiment of the invention. In particular, FIG. 9 illustrates a class hierarchy such as a superclass "A" and subclasses "B", "C", and "D". Once there has been function call within "A", any one of the function foo's for subclasses "B", "C", and "D" may be called at run time. When one of the subclasses such as "B," "C," or "D" is called, the corresponding vtable such as "B" vtable, "C" vtable or "D" vtable is opened or accessed.

FIG. 10 illustrates objects "B" class 600, "C" class 700, and "D" class 800 and vtables for "B" 610, "C" 710, and "D" 810 that may be used in accordance with one embodiment of the invention. At runtime, the vtable may be checked. For example, if object "x" is "B" class 600, it will point to "B's" vtable 610 and will invoke the corresponding foo ( ) 620. Additionally, object "x" may point to "C" class 700 which points to C's vtable 710 and invokes the corresponding foo ( ) 720. Alternatively, object "x" may point to "D" class 800 which points to "D's" vtable 810 and invokes the corresponding foo ( ) 820.

In order to inline using techniques of the invention, it is preferable that profiling information be collected. Profiling information relates to an instance that is "frequently invoked". It will be appreciated that the system designer or user designates the number of times an instance must be invoked to qualify as being "frequently invoked." Any number of times can be designated by the system designer or user. For instance, a 1000 times may be designated as the number of times an instance must be invoked in order to be considered "frequently invoked." Assume that the instance of foo for class "C" is frequently invoked because class "C's" instance is invoked over a 1,000 times. "C's" foo then is inlined.

When the code is compiled for the first time before execution, a native code is produced. Native code is a communication language or coding between machine units or modules which is peculiar to or usable for a particular type of equipment as described herein.

Figure 11:
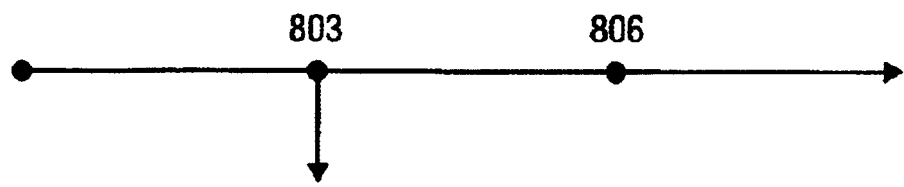
FIG. 11 illustrates a timeline in accordance with one embodiment of the invention.
Figure 12:
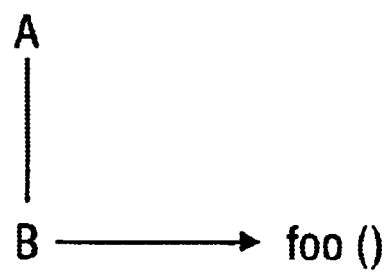
FIG. 12 illustrates a class hierarchy in accordance with one embodiment of the invention.
Figure 13:
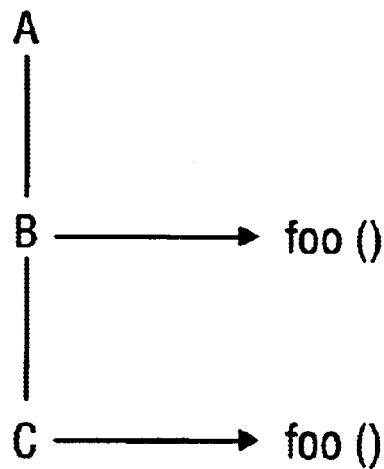
FIG. 13 illustrates a class hierarchy in accordance with one embodiment of the invention.

In order to understand inlining of various hierarchies at various points in time using techniques of the invention, FIGS. 11–13 are presented below. FIG. 11 illustrates a timeline in which two class hierarchies are invoked. At point 803, the class hierarchy of FIG. 12 is invoked. FIG. 12 shows a class hierarchy wherein "A" is a superclass of "B". "B" has a function foo ( ). If the class hierarchy does not change, then every time "B's" foo is invoked, there is only one instance that can be invoked. The advantage to this approach is that checking the vtable is unnecessary because the correct instance is always invoked.

At point 806, the class hierarchy of FIG. 13 is invoked. In this situation, there are two foo ( ). FIG. 13 represents a class hierarchy that is dynamically changing in accordance with one embodiment of the invention. Techniques of the invention use method overriding with this hierarchy. Method overriding is when an overridden method is invoked, the "dynamic method lookup" determines which method definition is applicable to the current object. For instance, the class hierarchy in FIG. 13 shows class "C" was dynamically loaded. In this example, B's foo was overridden by "C's" foo.

Figure 14A:
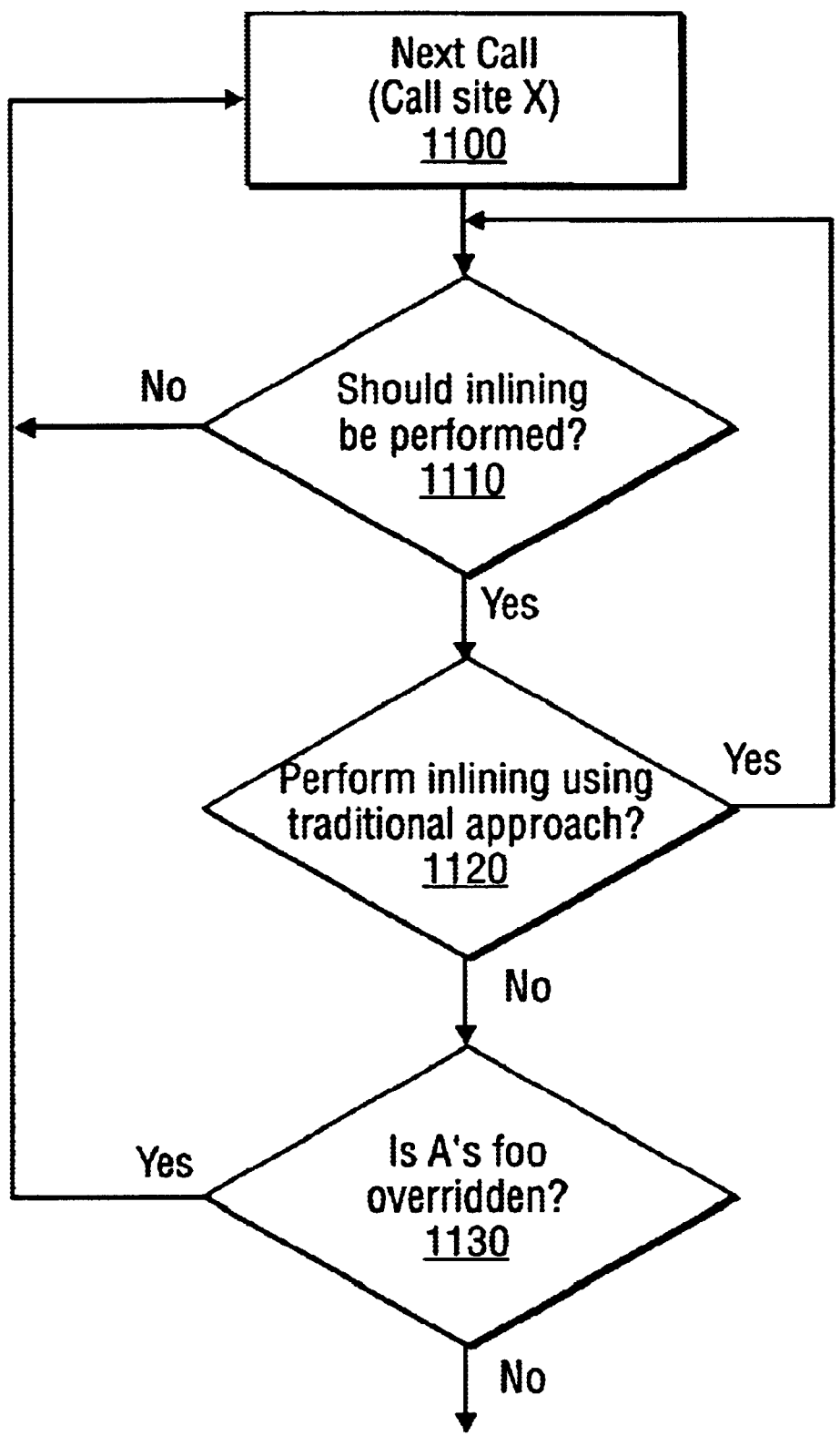
FIGS. 14A–14B illustrate a flow chart in accordance with one embodiment of the invention.
Figure 14B:
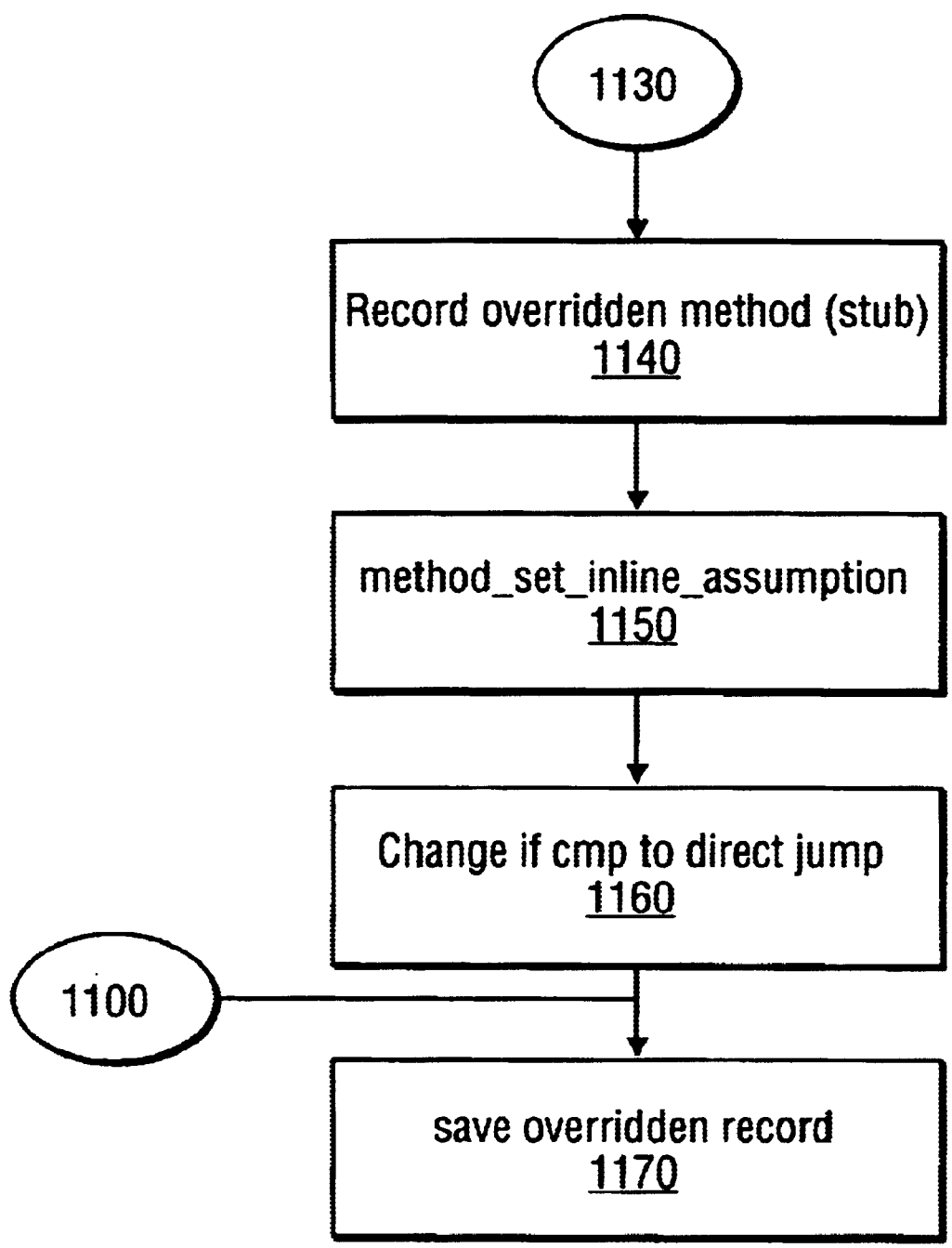

FIGS. 14A–14B illustrate a flow diagram in accordance with one embodiment of the invention. Once the code is compiled, all the call sites are determined at operation 1100. For example, there may be 10 function calls referred to as call sites. For every call site, there is an "X". At operation 1110, it must be determined whether to inline the call site being processed. If the response is "no", another call site is processed at operation 1100. When determining whether a call site should be inlined, processor 555 accesses a memory 560 to determine whether the call site is "frequently" called. A call site is "frequently called" when it exceeds a threshold level designated by the system designer or user. The threshold level may be any number designated by the system designer or user. Memory 560 maintains the number of times a call site is frequently called which is categorized as profiling information. If the answer is "yes", it must be determined whether to perform conventional inlining techniques at operation 1120. If the response is "yes," then conventional inlining is performed and another call site is accessed at operation 1100 and processed. The code after inlining is shown in FIG. 7. If the response is "no", then it is queried whether "A's" foo is overridden at operation 1130. If the response is "yes", another call site is accessed at operation 1100 and processed.

If the response is no, operation 1140 determines the location as to where the code is to be changed into a direct jump. The offset (i.e., [t+64]) is the beginning of the place of the code that needs to be fixed. The original code is kept in the overridden record such as a compare code cmp eax, 0bc3462h. Once the location is found, since the original code is stored in the overridden record, the original code can be written back. The operations of FIGS. 14A–14B are performed in the JIT compiler. Method_set_inline_ assumption at operation 1150 is the interface between the VM and the JIT compiler, by which the JIT compiler informs the VM that a call site (i.e. callee) in a method (i.e. caller) is inlined and the checking vtable (cmp instruction) is about to be replaced with a direct jump (described in operation 1160). As a result, the code does not have to be checked using the code shown in FIG. 7 as is the case with conventional techniques. Then a change can be made to the "if compare" to a direct jump at operation 1160. Thereafter, the next call site is accessed at operation 1100. Additionally, at operation 1170, the overridden record is saved in the memory 560 shown in FIG. 8.

Figure 15:
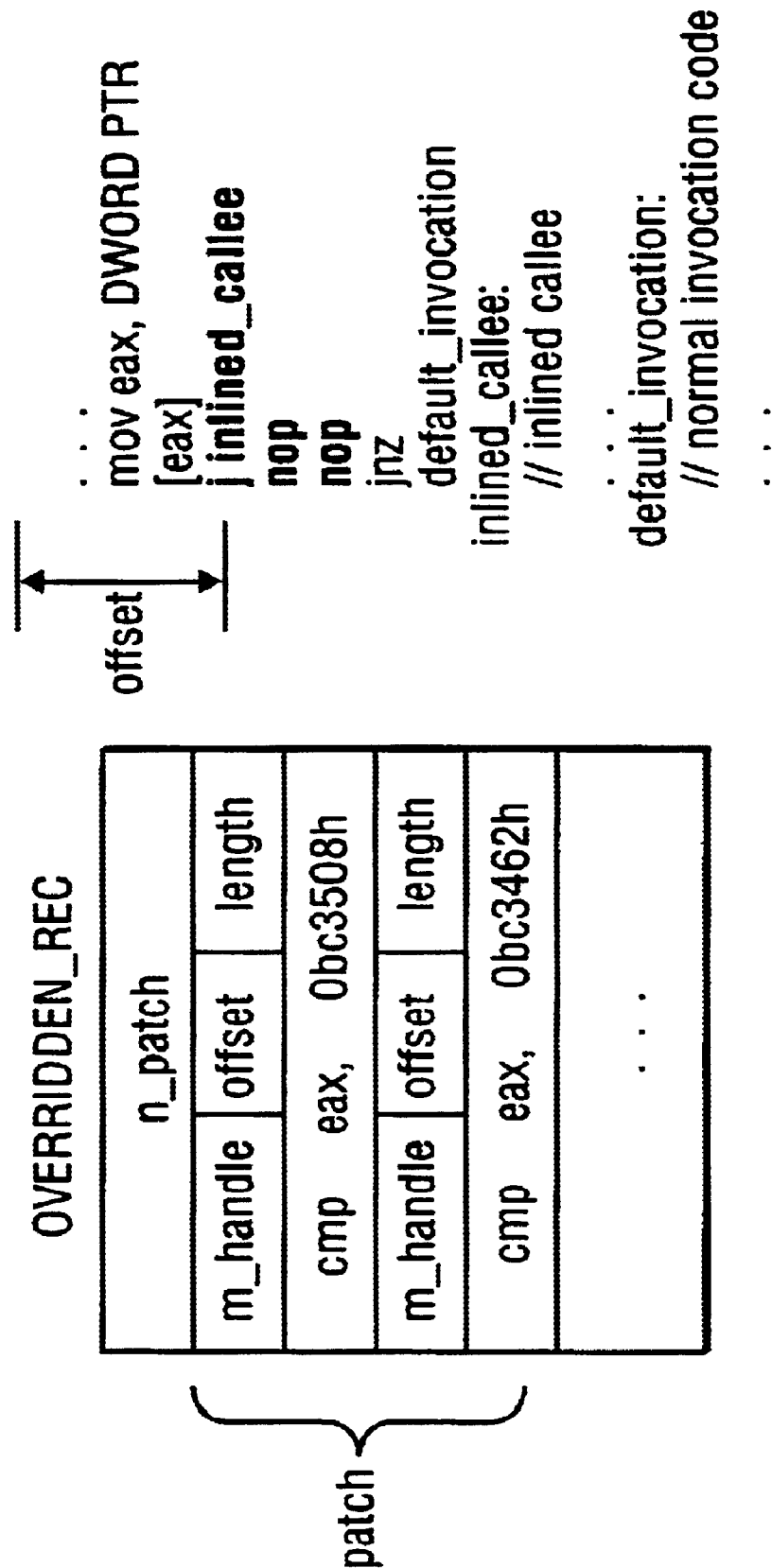
FIG. 15 illustrates a code used for dynamic patching in accordance with one embodiment of the invention.

When the VM loads a class and detects the method foo is overridden by the class. Information can be retrieved from the VM regarding the caller x and the callee foo, i.e., within x, we have inline "foo". The information is set by method_ set_inline_assumption at operation 1150. The VM can inform the JIT compiler that "x" has to be fixed. An overridden code is fixed by using dynamic patching and code patching. Dynamic patching is a technique that patches the native code to preserve the correctness of the program once the assumption made by the compiler is invalidated. The assumption is that the method is not overridden. FIG. 15 illustrates a table in which there is an overridden record for dynamic patching and corresponding code.

Using the operations explained above, the following provides one illustration of patching code. A compiler that performs optimization such as an optimizing compiler produces the inlining code sequence as shown in FIG. 5 for checking vtable (operation 1120). Operation 1160 replaces the "cmp" with a "jmp", directly to the inlined code as illustrated in FIG. 15. The overhead of the conditional test, one "cmp" and one "jnz", is reduced to one direct jump instruction. A patch entry is created for the "cmp" just replaced. The patch is composed of the method handle of the inlined method (i.e., callee), the code offset and length of the iA32 "cmp" instruction, and the byte array for storing the "cmp". Since the instruction length of the "cmp" is longer than the "jmp", no operation's ("nops") are filled in for the remaining bytes after the replacement. Operation 1150 then invokes an application program interface ("API") call, method_set_inline_assumption (caller, callee), to notify the VM that the caller has inlined the callee with the overridden optimization enabled code. An overridden_rec is created as part of caller's method_info containing all patches of the caller and the total number of the patches. A callback API, method_was_overridden (caller, callee), provided by the optimizing compiler, allows the VM to notify the compiler that the callee has been overridden. Therefore the caller's code must be fixed.

Method_was_overridden retrieves the caller's overridden_rec and fixes all the patches that have method handles that match that of the caller. Code patching must be thread-safe because other threads may be executing the instruction that is to be patched (i.e., the direct jump instruction). The code sequence the compiler uses to make code patching threadsafe is parsed into three steps as illustrated in FIG. 16.

First, the direct jump instruction is substituted by a spinning jump (i.e., jump to itself). A lock ensures writing 0xFEEB (e.g., two bytes) has exclusive use of any shared memory. This operation is atomic. An atomic operation is a computer function that must be performed all at once with no divisions. If an atomic operation is cut short, it must be restarted from the beginning. Other threads that happen to be executing the instruction will spin waiting for the completion of the patching. Second, except the first two bytes, the "cmp" is restored. Third, the first two bytes of the "cmp" are written atomically using lock.

It will be appreciated that code patching involves writing the code back. The code that must be patched as described above. Object-oriented programming languages such as JAVA is a multi-threaded program and one of the threads may be running the program at the point in which the code is to be patched. It must be ensured that when writing the code back, the program is still running. The instruction may become a spinning instruction and it jumps to itself. Thereafter, the rest of the code is patched. A compare operation is then performed of the jump code to the original code.

Figure 17A:
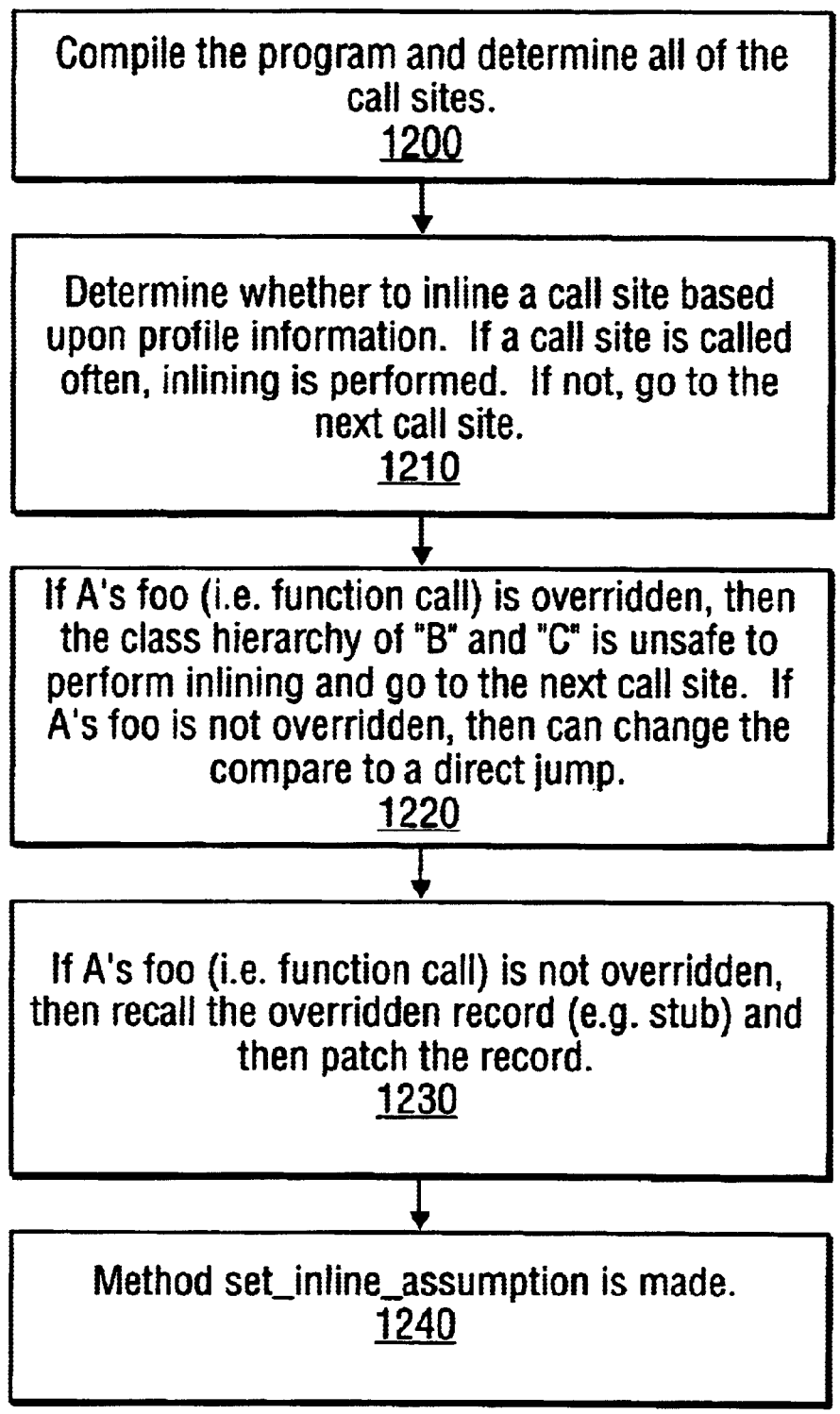
FIGS. 17A–17B illustrate a flow chart in accordance with one embodiment of the invention.
Figure 17B:
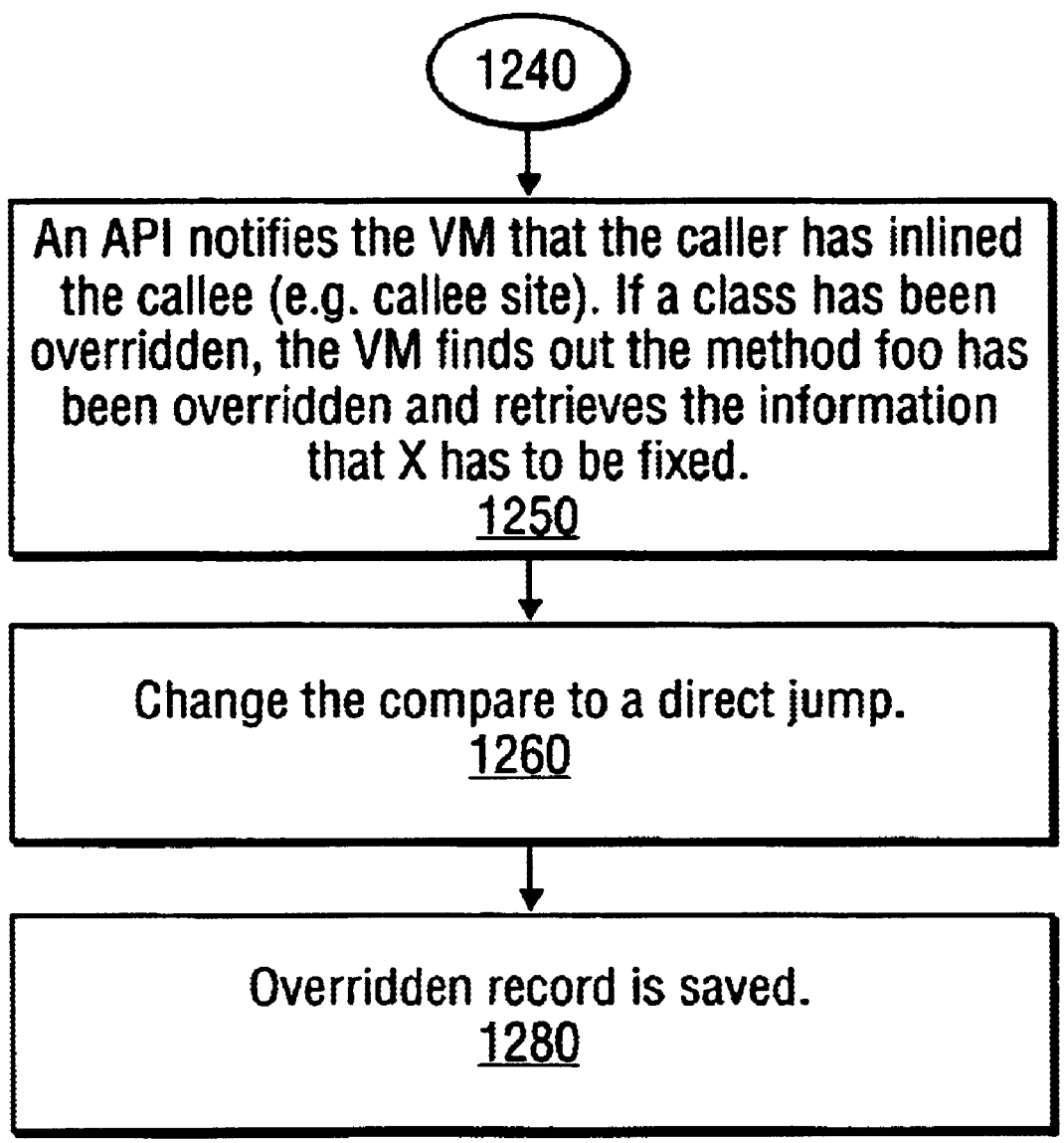

FIGS. 17A–17B illustrate another embodiment of the invention represented in a flow diagram in accordance with one embodiment of the invention. At operation 1200, the program is compiled and all the call sites are determined. For instance, there may be 10 function calls. A call site is a function call. At operation 1210, a decision is made as to whether to inline the call site based upon profile information. If a call site is called often (e.g., assume 1000 times is designated by a system designer), then inlining is performed. It will be appreciated that the system designer or user designates the number of times a call site which is considered to have been called often. This can be any number above "1". Preferably, the number of times a call site is called is greater than 50 times. If the call site is not called often, then the next call site is called and processed as described in operations 1200 and 1210.

At operation 1220, if A's foo (e.g., function call) is overridden, it is unsafe to perform an inlining operation on the class hierarchy of "B" and "C" as illustrated in FIG. 13 and the next call site must be accessed. If A's foo (e.g., function call) is not overridden, then the compare operation can be changed to a direct jump at operation 1220. At operation 1230, if A's foo (i.e., function call) is not overridden, then the overridden record is recalled using a stub and the record is patched as described above. At operation 1240, method_set_inline_assumption as described in operation 1150 is made. If the method is overridden, then the process proceeds to operation 1250. At operation 1250, an API which notifies the VM that the caller has inlined the callee (e.g., callee site). If a class has been overridden, the VM determines that method foo has been overridden and retrieves the information on the caller and callee that x has to be fixed. At operation 1260, change the "if cmp" instruction (if compare) to a jump to a direct address instruction. At operation 1280, the overridden record is saved.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
    compiling a method having a virtual method call;
    eliminating the virtual method call;
    inlining the method without generating a checking code;
    dynamically loading a class; and
    changing a compare instruction to a jump to a direct address instruction if a function call is not overridden.

2. The method of claim 1, further comprising: determining whether to inline a call site.

3. The method of claim 1, wherein another call site is processed if a first call site is not called often.

4. The method of claim 1, further comprising: recalling an overridden record.

5. The method of claim 4, comprising: patching native code using the record.

6. A machine readable storage medium containing executable program instructions which when executed cause a digital processing system to perform a method comprising:
    compiling a method having a virtual method call;
    eliminating the virtual method call;
    inlining the method without generating a checking code;
    dynamically loading a class; and
    changing a compare instruction to a jump to a direct address instruction if a function call is not overridden.

7. The machine readable storage media of claim 6, wherein the method comprises: determining whether to inline a call site.

8. The machine readable storage media of claim 6, wherein another call site is processed if a first call site is not called often.

9. The machine readable storage media of claim 6, wherein the method comprises:
    replacing code if function call is overridden.

10. The machine readable storage media of claim 6, wherein the method comprises: recalling an overridden record.

11. The machine readable storage media of claim 6, wherein the method comprises: patching a record.

12. A computer system comprising:
    a processor coupled to a memory;
    the memory having stored therein instructions which when executed by a processor cause the processor to generate data and to:
    compile a method,
    eliminate a virtual method call,
    inline the method without generating checking code,
    dynamically load a class; and
    change a compare instruction to a jump to a direct address instruction if a function call is not overriden.

13. The computer system of claim 12, the instruction further causes the processor to:
    determine whether to inline a call site.

14. A method comprising:
    compiling a method having a virtual method call;
    eliminating the virtual method call;
    inlining the method without generating a checking code;
    dynamically loading a class; and
    recalling an overridden record.

15. The method of claim 14, comprising:
    patching native code using the record.

16. A method comprising:
    compiling a method having a virtual method call;
    eliminating the virtual method call;
    inlining the method without generating a checking code; and
    changing a compare instruction to a jump to a direct address instruction if a function call is not overridden.

17. A method comprising:
compiling a method having a virtual method call;
eliminating the virtual method call;
inlining the method without generating a checking code; and
recalling an overridden record.

18. The method of claim 17, comprising: patching native code using the record.

19. A machine readable storage medium containing executable program instructions which when executed cause a digital processing system to perform a method comprising:
compiling a method having a virtual method call;
eliminating the virtual method call;
inlining the method without generating a checking code;
dynamically loading a class; and
recalling an overridden record.

20. The machine readable storage of claim 19, comprising:
patching native code using the record.

21. The machine readable storage medium containing executable program instructions which when executed cause a digital processing system to perform a method comprising:
compiling a method having a virtual method call;
eliminating the virtual method call;
inlining the method without generating a checking code; and
changing a compare instruction to a jump to a direct address instruction if a function call is not overridden.

22. A machine readable storage medium containing executable program instructions which when executed cause a digital processing system to perform a method comprising:
compiling a method having a virtual method call;
eliminating the virtual method call;
inlining the method without generating a checking code;
dynamically loading a class; and
replacing code if function call is overridden.

23. A method comprising:
compiling a method having a virtual method call;
eliminating the virtual method call;
inlining the method without generating a checking code; and
replacing code if function call is overridden.

24. A machine readable storage medium containing executable program instructions which when executed cause a digital processing system to perform a method comprising:
compiling a method having a virtual method call;
eliminating the virtual method call;
inlining the method without generating a checking code; and
replacing code if function call is overridden.

* * * * *